(No Model.)
A. LARSON.
DEVICE FOR TRANSMITTING POWER.
No. 403,598. Patented May 21, 1889.
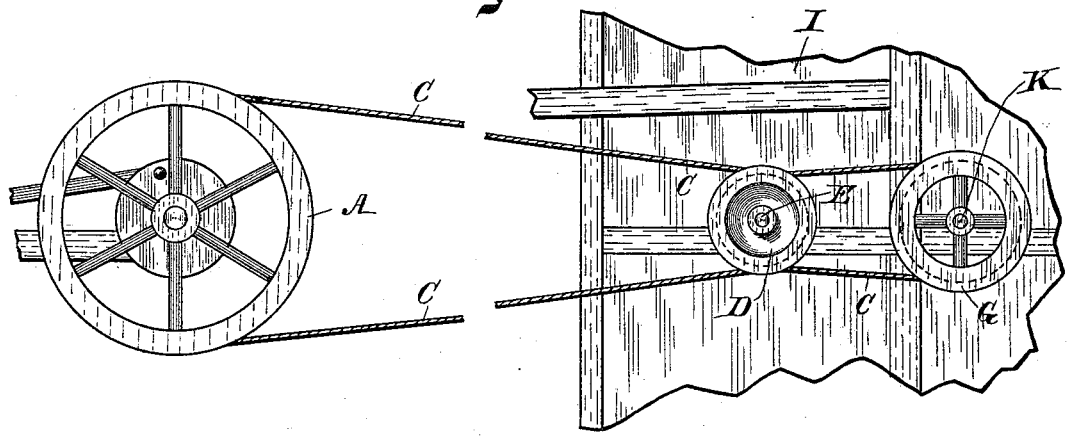
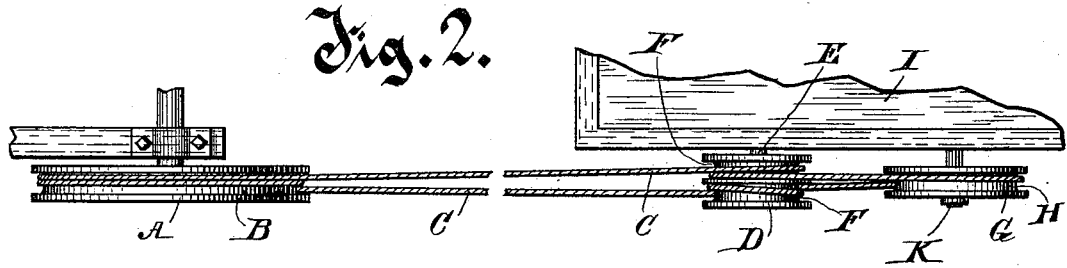

UNITED STATES PATENT OFFICE.

ADOLPH LARSON, OF MAPLETON, WISCONSIN.

DEVICE FOR TRANSMITTING POWER.

SPECIFICATION forming part of Letters Patent No. 403,598, dated May 21, 1889.

Application filed March 1, 1889. Serial No. 301,695. (No model.)

*To all whom it may concern:*

Be it known that I, ADOLPH LARSON, of Mapleton, in the county of Waukesha and State of Wisconsin, have invented a new and useful Device for Transmitting Power to a Thrashing-Machine; and I do hereby declare the following to be a full, clear, and exact description of said invention, reference being had to the accompanying drawings, and to the letters or figures of reference marked thereon, which form a part of this specification.

In running thrashing-machines it is common to transfer the power and motion from the engine to the cylinder of the machine by a band running on the driving-pulley of the engine and on a pulley on the shaft of the cylinder of the thrashing-machine or on a shaft geared thereto, and as on account of the danger of fire being communicated from the fire-box or smoke-stack of the engine to the straw the thrashing-machine is usually stationed at considerable distance from the engine, and the power-transmitting belt is therefore a long one and commonly consists of a band several inches in width, much annoyance occurs by reason of the sagging of the belt and its liability to slip on the pulleys, as well as by the belt being caught by the wind and thrown off the pulleys or so jerked and twisted as to interrupt a steady and reliable movement of the cylinder, and my device is intended and adapted to obviate the objections stated under the conditions mentioned.

In the drawings, Figure 1 is a side view of the driving-wheel of an engine, the power-transmitting belt, and the pulleys on which the belt runs on shafts or arbors supported in the frame of the thrashing-machine. Fig. 2 is a top view of the same device shown in Fig. 1.

In the drawings, A is the driving-wheel of an engine. This driving-wheel is provided with a groove, B, in its periphery in which the belt C runs, which belt is a round or nearly round cable, preferably made of flexible steel wire. A pulley, D, is fast on the shaft E, which shaft carries the thrashing-machine cylinder or is geared thereto. The periphery of the pulley D is provided with two grooves, F F, in each of which one line or strand of the cable C is adapted to run. An idle-pulley, G, runs on an arbor, K, supported in the frame I of the thrashing-machine, and is provided with a groove, H, in its periphery. The cable C is carried entirely around the wheel A, in the groove B, and somewhat more than half-way around a second time, so that it has a large surface bearing on the wheel A, whereby any slipping of the cable thereon is obviated, and one strand of the cable is carried entirely around the pulley D in one groove, and therefrom the cable runs around and upon the idle-pulley G, returning and passing entirely around the pulley D in the other groove thereof, by which construction and arrangement of the pulleys and cable any possible slipping on the driven pulley D is successfully obviated.

In the drawings the cable C is broken between the wheel A and the pulley D, which form of illustration is adopted to show the parts of the mechanism in their relation to each other, except only in the distance apart at which the driving-wheel A and pulley D are located, which is usually a great distance for the use of a belt. When a beater or other similar device is used in the thrashing-machine, the pulley G may be fixed on the shaft of the beater or similar device instead of running idle on an arbor, as shown in the drawings.

What I claim as new, and desire to secure by Letters Patent, is—

The combination of a driving-wheel, A, having a groove in its periphery, a driven pulley, D, and an idle-pulley, G, the two pulleys D and G being supported on a thrashing-machine, I, at a considerable distance from the driving-wheel A, in combination with a cable-belt, C, carried entirely around the wheel A, around the idle-pulley G, and each strand of the cable being carried entirely around the pulley D in a groove in its periphery, the pulley D being located intermediate the pulley G and wheel A, substantially as described.

In testimony whereof I affix my signature in presence of two witnesses.

ADOLPH LARSON.

Witnesses:
ANTHONY LARSON,
JOHN D. REED.